United States Patent [19]

Yokoyama et al.

[11] 4,122,715
[45] Oct. 31, 1978

[54] APPARATUS FOR MEASURING FLOW RATE OF POWDERY AND/OR GRANULAR MATERIAL

[75] Inventors: Tohei Yokoyama, Toyonaka; Kiyoshi Urayama, Kyoto, both of Japan

[73] Assignee: Kabushiki Kaisha Hosokawa Funtai Kogaku Kenkyusho, Osaka, Japan

[21] Appl. No.: 768,816

[22] Filed: Feb. 15, 1977

[30] Foreign Application Priority Data

Feb. 16, 1976 [JP] Japan .................................. 51-16287

[51] Int. Cl.² .............................................. G01F 1/28
[52] U.S. Cl. ......................................... 73/228; 222/55
[58] Field of Search .............................. 73/228; 222/55

[56] References Cited

U.S. PATENT DOCUMENTS

| 3,232,486 | 2/1966 | Ofner | 73/228 X |
| 3,640,136 | 2/1972 | Nolte | 73/228 |

FOREIGN PATENT DOCUMENTS 1,001,828  1/1957  Fed. Rep. of Germany ............ 73/228

Primary Examiner—Richard C. Queisser
Assistant Examiner—John P. Beauchamp
Attorney, Agent, or Firm—Edwin E. Greigg

[57] ABSTRACT

An apparatus for measuring flow rate of powders or granules forced out off the periphery of a loading table to fall down gravitationally. Deflector members arranged within the gravitational fall path of the powders or granules are subjected to a rotary force by impingement thereon of the powders or granules. Flow rate is measured as proportional to the moment for rotation.

5 Claims, 8 Drawing Figures

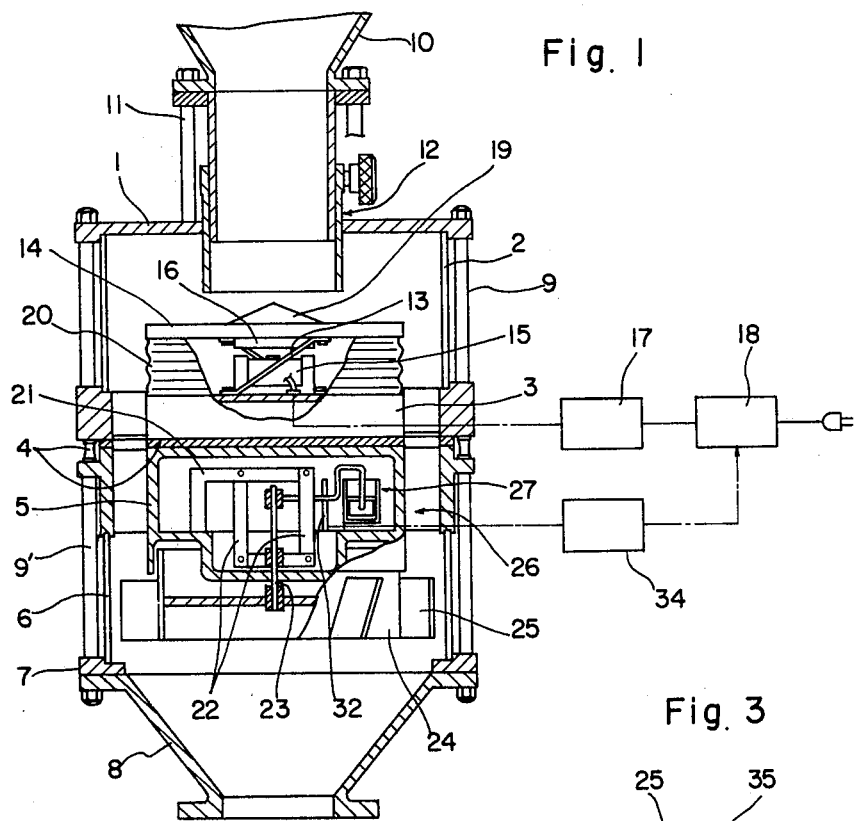
Fig. 1
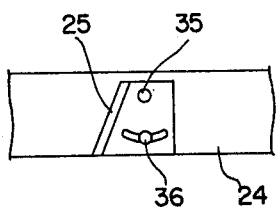
Fig. 3
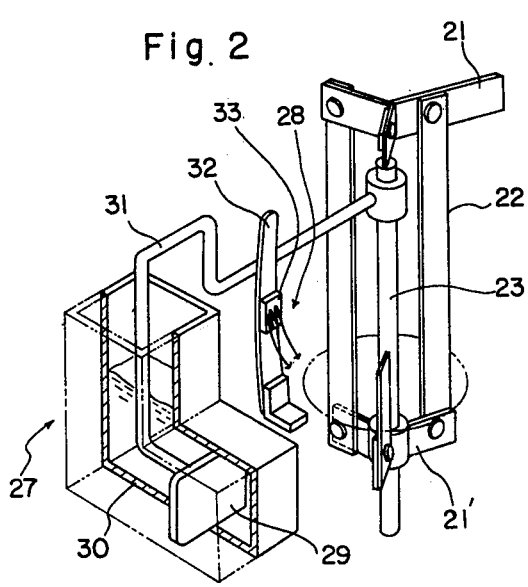
Fig. 2
Fig. 4

Fig. 5
Fig. 6
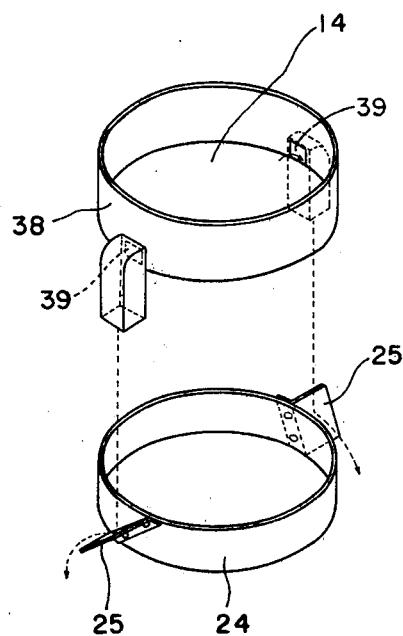
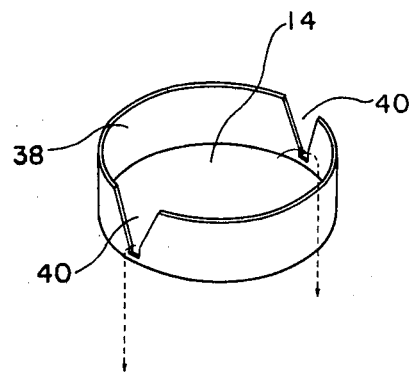
Fig. 7
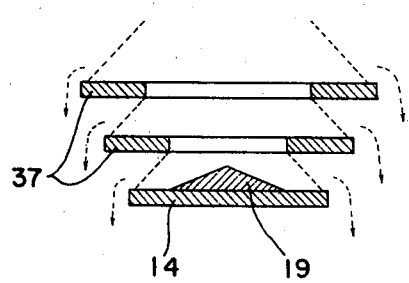
Fig. 8
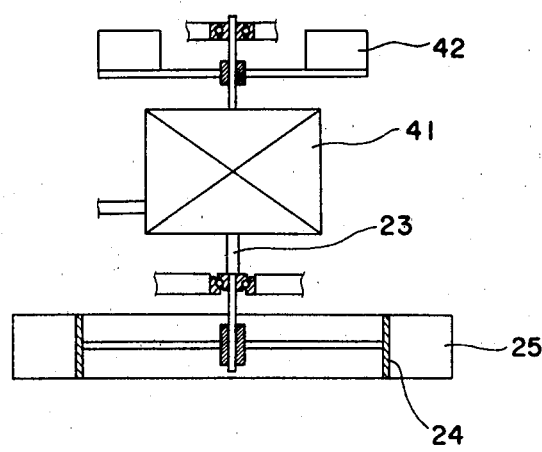

APPARATUS FOR MEASURING FLOW RATE OF POWDERY AND/OR GRANULAR MATERIAL

BACKGROUND OF THE INVENTION

The present invention relates to an apparatus for measuring continuous flow rate of gravitationally falling powdery and/or granular material (hereinafter referred to simply as "powders") by sensing the moment exerted on deflector means impinged on by the falling powders.

A conventional apparatus of this type comprises a torsion wire suspending a rod, with deflector means secured to one end of the rod to be impinged on by the falling powders while the other end of the rod has a baffle plate immersed in a viscous fluid for damping the movement, and gives the flow rate by sensing the torsional stress in the wire. As a modification thereof, it is also conventional to replace the torsion wire with a rod, resiliently held for instance by a coil spring, to similarly give the flow rate by sensing the angular displacement of the rod.

In either of these conventional apparatuses, the deflector member is provided without any balancing or symmetry around the center of the torsional angularly displacing movement, and therefore the impingement of the powders on such deflector member causes not only the intended moment for rotation but also undesirable side effects in non-negligible, substantial degree, such for instance as lateral twisting of the torsion wire or frictional loss in the rod bearing portion. This will seriously affect the, precision of measurement particularly when the flow rate is quite small.

SUMMARY OF THE INVENTION

According to the present invention there is provided an apparatus for measuring flow rate of powdery and/or granular material (referred to simply as "powders" as already mentioned before) with: dropping means for forcing the powders into continuous gravitational fall; deflector means arranged within the fall path for impingement thereon of the falling powders thus to be subjected to moment for rotation by the impingement; and measuring means for measuring the flow rate of the falling powders upon sensing the moment for rotation or angular displacement around a vertical center axis, as exerted on the deflector means; in which the improvement comprises that the dropping means includes a loading table; that periphery of the loading table has at least two fractional portions, with possibility of merger into the entire periphery without demarcation of the fractional portions, so adapted that the powders on the loading table may fall down therethrough off the loading table; and that the deflector means includes at least two deflector members arranged in such good balance around the said center axis that the center of gravity of the falling powders impinging on these deflector members substantially coincides with the said center axis.

With such provision of the deflector members in good balance around the axis of the angular displacement of the entirety of the deflector means, and with dropping supply of the powders properly on the deflector members, the force exerted on the deflector members by the impingement of the falling powders causes substantially pure moment for rotation of the entirety of the deflector means, with quite little, if any, undesirable side effects as tensile and twisting stresses or frictional losses in the deflector means bearing portion. This insures to precise measurement with minimal instrumental error even in case of very small flow rates of the powders, to say nothing of the case of large flow rates.

It is thus the main object of the invention to provide an apparatus for measuring the flow rate of the continuously supplied falling powders by sensing the moment exerted on deflector means impinged upon by the falling powders, featuring very precise measurement by exact and effective transformation of the falling momentum of the powders into the moment for rotation of the deflector means.

It is also an object of the invention to provide an apparatus of the type mentioned above, as will give proper and precise measurement for powders having a variety of characteristics.

Other objects and advantages of the invention will become apparent from the following detailed description of some preferred embodiments of the invention illustrated in the accompanying drawings.

BRIEF DESCRIPTION OF THE DRAWINGS

FIG. 1 is a side elevation partly in section, and with some parts cut away for clearer view, of an apparatus according to the invention, omitting some parts of minor significance thereof;

FIG. 2 is an enlarged perspective view of a portion of the apparatus, with a portion cut away and shown in phantom;

FIG. 3 is an enlarged front view showing how a deflector member is mounted;

FIG. 4 is an enlarged front view showing a modified embodiment of the portion supporting the deflector means;

FIGS. 5-7 are schematic perspective views and sectional elevation, respectively, of the different embodiments of the powder dropping means; and FIG. 8 is a schematic side elevation, partly in section, of a modified embodiment of the measuring means.

DESCRIPTION OF THE PREFERRED EMBODIMENTS

As seen in FIG. 1, a top plate 1, a transparent upper cylinder 2, a supporting table 3, a resilient buffer 4, a sealed casing 5, a lower cylinder 6, a washer 7 and a lower hopper 8 are provided in this order from top of bottom, with the top plate 1, upper cylinder 2 and supporting table 3 rigidly connected by means of a plurality of screw bolts 9 and nuts, and with the sealed casing 5, lower cylinder 6, washer 7 and lower hopper 8 similarly rigidly connected also by means of a plurality of screw bolts 9' and nuts, with the resilient buffer 4 interconnecting these upper and lower rigid assemblies.

Furthermore, an upper hopper 10 is secured with stays 11 on to the top plate 1 and a discharging tube 12 with center axis always kept substantially vertical is attached to the upper hopper 10 to protrude down through a corresponding aperture provided in the top plate 1, in such manner that the protrusion length is adjustable. Beneath the discharging tube 12 a loading table 14 in the general shape of a disc is provided, with a spacing interval therefrom and coaxially therewith, as supported on the supporting table 3 by means of a plurality of slant leaf springs 13. The powders gravitationally falling from the upper hopper 10 are thus loaded on the loading table 14.

On the lower surface of the loading table 14 a ferromagnetic plate 16 is fixed and closely therebeneath an electromagnet 15 is fixed on the supporting table 3.

Power to the electromagnet 15 is supplied from a household alternating current source via a transformer 18 and a half-wave rectifier 17. The electromagnet 15 is thus energized intermittently, and the loading table 14 is accordingly subjected to minute reciprocating vibrations angularly around the center axis thereof as well as along the vertical line. By this vibration of the loading table 14, the powders loaded thereon are continuously forced out off the periphery quite uniformly all over the entire portion thereof. A cone table 19 fixed on upper surface of the loading table 14 to protrude upwards concentrically therewith makes the movement of the powders smoother on the loading table 14 towards the periphery thereof. A flexible dust prevention covering tube 20 is provided to isolate the driving mechanism for the loading table 14, from the falling powders.

Flow rate of the powders falling down from the loading table 14 can be freely adjusted as desired by regulating the transformer 18 and/or extension or retraction of the adjustable discharging tube 12.

A stay 21 is secured to the inner surface of the sealed casing 5 for suspending three leaf springs 22 whose lower ends are held and connected together by a tripod spider 21' as best seen in FIG. 2. A vertical shaft 23 is fixed to the spider 21' and supported thereby to extend vertically and coaxially with respect to the loading table 14. Thus, when a moment is applied to the shaft 23, fractional rotation or angular displacement thereof is permitted until the moment is counterbalanced by the resilient deformation stress of the leaf springs 22 exerted via the spider 21'. The shaft 23 extends through the spider 21' and further protrudes through the sealed casing 5, as seen in FIG. 1, for suspending thereby, coaxially with the loading table 14, a tubular body 24 provided with a plurality of slant vanes 25 protruding radially outwardly on the outer cylindrical periphery at regular intervals along and symmetrically disposed around the center axis, in such manner as to properly receive the powders falling from the loading table 14 to this region along a path 26 of annular form, thus to serve as deflector members for the falling powders impinging thereon. A moment is therefore actually exerted on the shaft 23 responsive to such impingement, and the shaft 23 is angularly displaced in accordance with the flow rate of the falling powders.

Also provided within the sealed casing are a baffle assembly 27 for damping the movement of angular displacement of the shaft 23, as well as a sensor assembly 28 for sensing the angular displacements of the shaft 23.

The damping assembly 27 comprises a baffle plate 29 immersed in a viscous fluid within a container 30 to move therein integrally with the angular displacement of the shaft 23 as transmitted via a connecting arm 31, for damping excessive, abrupt angular displacement of the shaft 23. The angular displacement sensor assembly 28 comprises a leaf spring 32 positioned in the path of swinging movement of said connecting arm 31. The spring is provided with a strain gauge 33 affixed thereon to act as transducer for transforming the bending deformation of the leaf spring 32 into a variation of electrical resistance. As described above, the spider 21', shaft 23, tubular body 24, vanes 25, arm 31 and plate 29 make up an assembly to be angularly displaced as an entirety, and this assembly may later be referred to as "deflector means". The illustration is intended to show a controller 34 which will detect and indicate the variation of the electric resistance and at the same time actuate an automatic control mechanism provided in the transformer 18 as a built-in unit, in such way that the flow rate is readjusted to compensate the balance between the actual sensed value and a predetermined desirable value. Thus, it is easy to properly detect and maintain a predetermined flow rate of the powders discharged from the lower hopper 8, automatically.

Referring to FIG. 3, each vane 25 has a base plate portion freely slidable on the outer cylindrical surface of the tubular body 24 around a pivot 35 protruding therefrom. The vanes, therefore, may be set in any desired position within the pivoting movement range as defined by an arcuate slot and a clamping bolt 36 provided therethrough and mating with a threaded bore in the cylindrical surface 24. Thus, the slant angle of the vanes 25 is adjustable to best suit every particular case, in accordance with the range of the flow rate and physical characteristics of the powders, such for instance as the specific gravity or the like.

For those skilled in the art, it is clear that instead of the illustrated vanes 25 there are many other possible forms and structure of the deflector members to be impinged on by the powders falling from the loading table 14. Similarly, the structure for supporting the deflector means 21', 23, 24, 25, 31, 29 may be modified in various ways. For instance, the leaf springs 22 may be slantedly disposed with wider spacing between one another at the upper ends, as illustrated in FIG. 4; or entirely other modes as well are possible, as utilizing a vertical shaft provided with a coil spring to receive the angular moment or using a torsion wire for the same purpose. In any case, it is important only to provide the deflector members 25 in proper place within the annular path 26 of the falling powders, in substantial symmetry around an axis substantially coinciding with the axis of the annular path, for free angular displacement around the symmetry axis against the resilient restoring force.

Also, the dropping means for forcing the powders to fall continuously may be the subject of many modifications other than the illustrated specific instance of the loading table 14. For instance, a square table might similarly be used, or auxiliary annular ring shape plate or plates 37, thus in one stage or multiple stages, might be provided above the loading plate 14 with proper vertical spacing between one another, as shown in FIG. 7, for dropping the powders from each of the plates 14 and 37. The driving mechanism, illustrated and described as electromagnetic, may also be modified to mechanical or hydraulic means. In either case it is quite obvious to provide the mechanism for dropping the powders on the loading table 14 substantially uniformly all over the entire periphery.

The above description i.e. forcing the powders uniformly off the entire periphery of the loading table 14, is preferable so that the deflector members 25 may properly receive the falling powders and effectively measure the flow rate thereof. However, it is also possible to force the powders out through at least two specific fractional portions of the periphery of the loading table 14. As shown in FIG. 5 the table 14 is provided with a peripheral wall 38 continuously covering the entire circumference except for passage apertures 39 to serve as outlets for the powders. As shown in FIG. 6 a similar wall 38 is provided with triangular cutouts 40 instead of the apertures 39 in FIG. 5. In any case, the outlets 39, 40 for the powders should be arranged in substantial symmetry around a vertical axis and the deflector means 25 should also be arranged in substantial symmetry around the same vertical axis, and these in order to attain the objects of the invention. Obviously, the outlets 39, 40 for the powders and the deflector means 25 should preferably be equal in number and should be in good vertical alignment with one another as best seen in FIG. 5. The minimum mathematical requirement to be satisfied with respect to the numbers of such symmetrically arranged outlets 39, 40 and deflector members 25 is that the two numbers must have a common divisor other than unity, thus equal to or greater than two.

The sensor element of the measuring means, to sense the moment of rotation exerted on the deflector means 25, for measuring the flow rate of the powders, may also take various forms other than the illustrated instance of the strain gauge 33. For instance a pointer to move mechanically or electrically in interlocking relationship with the deflector means for giving a readout in a set scale, may be used and such may naturally be incorporated with a recorder or any operational instrument, such as an integrator or accumulator.

As already mentioned, the block diagram in FIG. 1 shows a feed-back system for controlling the flow rate of the falling powders responsive to the result of the actual measurement of the flow rate, as is thus preferable for maintaining a set constant flow rate or regulating the flow rate according to the predetermined program. However, the block 34 in FIG. 1, described as controller, may also be a simple indicator without any such feed-back means.

The measuring means for measuring the flow rate of the powders upon sensing the moment for rotation exerted on the deflector means has so far been illustrated and described as based on the angular displacement of the deflector means against a resilient restoring force. However, the deflector means may be constructed for free rotation in which case its speed is proportional to the flow rate of the powders. FIG. 8 shows such an embodiment, where a sensor 41 for instance a dynamo, is fixed on to the shaft 23 as described with respect to FIGS. 1 and 2 thus accompanying the tubular body 24. Rotational speed of the tubular body 24 may thereby be sensed and the flow rate of the powders is known accordingly. In this instance, a wheel or disc with damping vanes 42 is fixed to the rotating shaft 23. It should be noted, however, that measurement based on the rotational speed of the deflector means may be somewhat less accurate than that based on the angular displacement of the deflector means against a resilient restoring force, because of the disturbing wind caused by the rotation. Thus the formerly described system based on angular displacement and using a transducer such as the strain gauge 33, or any system which does not angularly displace the deflector means by providing means for compensating the moment exerted by the impingement of the falling powders and means for sensing such compensating moment, is preferable to enable more accurate measurement.

We claim:

1. Apparatus for measuring the flow rate of gravitationally falling powdered or granular material comprising:
   a housing;
   loading table means within said housing for temporarily supporting the material;
   means for feeding material to said table means;
   means for vibrating said table to cause continuous flow of material over at least two areas of the peripheral portion of said table to establish free falling streams of the material within said housing;
   at least two deflector means below said table means within said housing, symmetrically mounted for rotation around a vertical axis passing through the center of said table means and positioned to be impinged on by the falling material which exerts a moment of rotation thereto around said axis; and
   measuring means responsive to the value of said moment of rotation for indicating the flow rate of the material.

2. Apparatus as defined by claim 1 wherein said loading table means is disc shaped and the material flows substantially uniformly off the entire periphery to form a substantially homogeneous annular falling column.

3. Apparatus as defined by claim 1 in which said loading table means is a disc shaped member with a cylindrical wall extending vertically upwardly from its periphery and means defining a pair of oppositely disposed openings through said wall.

4. Apparatus as defined by claim 3 in which said openings are located near the juncture between said wall and said disc, said wall having a pair of downwardly directed duct members, one communicating with each of said openings respectively.

5. Apparatus as defined by claim 1 in which said loading table means comprises:
   a disc member having a central upwardly extending conical portion; and
   a pair of annular rings spaced vertically concentrically above said disc, the uppermost ring being of larger diameter than the lower ring and the lower ring having a diameter greater than said disc.

* * * * *